United States Patent [19]

Larseneur

[11] Patent Number: 5,199,685

[45] Date of Patent: Apr. 6, 1993

[54] FLUID FLOW CONTROL DEVICE COMPRISING A DEFORMABLE MASKING MEMBRANE TRANSVERSE TO THE FLUID FLOW

[75] Inventor: Patrick Larseneur, Versailles, France

[73] Assignee: Valeo Thermique Habitacle, Le Mesnil-Saint-Denis, France

[21] Appl. No.: 834,935

[22] Filed: Feb. 13, 1992

[30] Foreign Application Priority Data

Feb. 21, 1991 [FR] France .................. 91 02102

[51] Int. Cl.$^5$ .................................. F16K 7/00
[52] U.S. Cl. ........................ 251/212; 251/294; 251/331; 251/901
[58] Field of Search .............. 251/212, 331, 901, 294

[56] References Cited

U.S. PATENT DOCUMENTS

| | | | |
|---|---|---|---|
| 2,674,064 | 4/1954 | Gassaway | 137/846 X |
| 2,874,925 | 2/1959 | Stafford | 251/212 X |
| 3,204,919 | 9/1965 | Tripoli | 251/331 X |

FOREIGN PATENT DOCUMENTS

| | | | |
|---|---|---|---|
| 229545 | 7/1987 | European Pat. Off. | |
| 1052760 | 8/1959 | Fed. Rep. of Germany | |
| 309194 | 9/1971 | U.S.S.R. | 251/212 |
| 2100417 | 12/1982 | United Kingdom | |

*Primary Examiner*—Robert G. Nilson
*Attorney, Agent, or Firm*—Morgan & Finnegan

[57] ABSTRACT

A fluid flow control device comprises a duct having a masking membrane arranged within the duct for movement between a first position, in which it closes the duct, and a second position in which it allows fluid to pass through the duct. The masking member is in the form of a deformable membrane disposed across the duct, the membrane having two portions having bellows-type folds and opposed end elements defining between them a flow aperture, which can be opened or closed to adjust the fluid flow.

6 Claims, 1 Drawing Sheet

FLUID FLOW CONTROL DEVICE COMPRISING A DEFORMABLE MASKING MEMBRANE TRANSVERSE TO THE FLUID FLOW

FIELD OF THE INVENTION

This invention relates to a control device for interrupting and adjusting the flow rate of a fluid, in particular an airstream for delivery into the cabin of a motor vehicle.

BACKGROUND OF THE INVENTION

Heating and ventilating, or air conditioning, installations for the cabins of motor vehicles commonly include air flow control devices comprising a masking member in the form of a pivoting or sliding valve member disposed in a corresponding fluid flow duct. The pivoting or sliding movement of these valve members, and the presence of actuating means for the latter, necessitates quite a large component size in the direction of the fluid flow and/or transversely to that direction, which makes such devices difficult to fit into the restricted space that is available below the fascia of the vehicle.

DISCUSSION OF THE INVENTION

An object of the invention is to overcome the above disadvantage and to provide a more compact control device.

According to the invention in a first aspect, a fluid flow control device comprising a masking member arranged in a duct for the said fluid flow, the duct being adapted to assume a first position in which it closes the said duct and a second position in which it allows the fluid to pass through the duct, is characterised in that the masking member is a deformable membrane fixed by its periphery to the wall of the duct and having at least one aperture which extends through its thickness, together with two groups of folds in the form of a bellows, extending in the same direction as the said aperture and on either side of the latter, with the edges of the aperture being deformable by means of a drive member, so as to be spaced away from each other, by putting the membrane in the said first position in which the aperture is open and of a lenticular shape, the edges of the aperture being further arranged to be engaged together by putting the membrane in the said second position in which the aperture is closed.

Preferably, the edges of the aperture carry elongate reinforcing elements, which are preferably in the form of resilient metallic laminae having surfaces arranged facing each other.

In a first embodiment of the invention, each edge of the aperture is provided with a single metallic reinforcing lamina, the ends of which are brought towards each other in the said first position and moved further apart in the said second position.

Alternatively, each edge of the aperture is provided with at least two metallic laminae adapted to slide telescopically over each other, with the element comprising the said telescopic laminae having a greater length in the first position than in the second position, and having its ends fixed to the wall of the fluid flow duct.

According to a preferred feature of the invention, the drive member comprises a cable mounted for sliding movement in a sheath, one end of which is attached to the central zone of a first reinforcing element, with part of the cable projecting beyond the said end of the sheath and being attached in the central zone of a second reinforcing element opposed to the first reinforcing element.

According to the invention in a second aspect, there is provided a membrane for a device according to the said first aspect of the invention, comprising a peripheral zone adapted to be fixed to the wall of a duct, and having an aperture which extends through its thickness together with two groups of bellows type folds extending in the same direction as the said aperture on either side of the latter, and with the edges of the aperture being arranged to be spaced apart so as to open the aperture into a lenticular shape, and engaged together so as to close the aperture.

Further features and advantages of the invention will appear more clearly from the description of preferred embodiments of the invention which follows, and which is given by way of example only and with reference to the accompanying drawings.

DESCRIPTION OF PREFERRED EMBODIMENTS OF THE INVENTION

Figure 1:
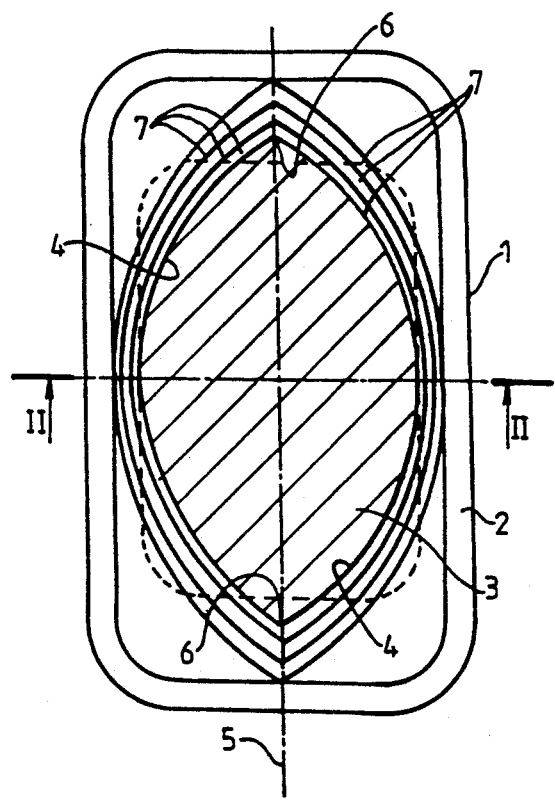
FIG. 1 is a plan view of a masking membrane in a device according to the invention, in the open position.
Figure 3:
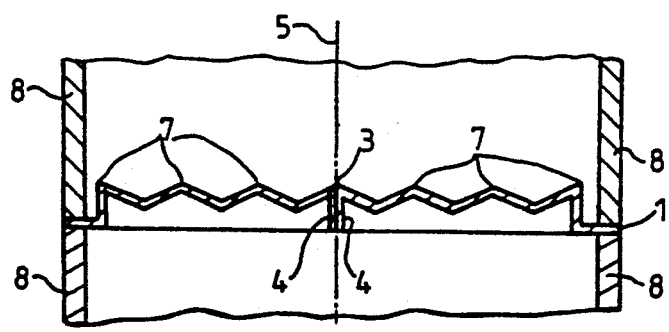
FIG. 3 is a view similar to FIG. 2, with the membrane in its closed position.
Figure 2:
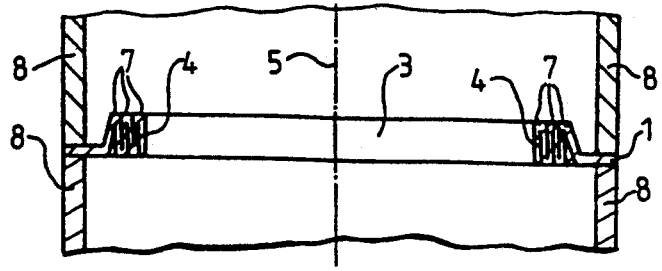
FIG. 2 is a view in cross section taken on the line II—II in FIG. 1.

The membrane shown in FIGS. 1 to 3 has a peripheral edge 1 which is in the form of a rectangle with rounded corners, and which bounds an annular marginal zone 2 extending in one plane. An aperture 3 extends through the thickness of the membrane, this aperture being delimited by two lips 4 which extend respectively on either side of the longitudinal median plane 5 of the membrane. The median plane 5 is perpendicular to the plane of the marginal zone 2, and the lips 4 are joined together in two zones 6 which are spaced apart in the plane 5. The lips 4 are joined to the marginal zone 2 without any discontinuity, through two series of bellows-type folds 7 which also extend longitudinally with respect to the lips 4, i.e. in the same general direction as the latter, on either side of the plane 5 in which the folds 7 of the two series are joined together. The marginal zone 2 of the membrane is fixed to the wall of a fluid flow duct 8, and accordingly the lips 4 may be spaced from each other in their central region as shown in FIGS. 1 and 2, by means which will be described below and which open the aperture 3 into a lenticular shape. The folds 7 of each group are then folded up against each other, and the fluid stream can pass through the membrane through the aperture 3. Alternatively, the lips 4 may be engaged against each other, as shown in FIG. 3, so as to close the aperture and prevent flow of the fluid. The folds 7 are now stretched out, and the junction zones 6 of the lips are spaced further away from each other than in the position shown in FIG. 1.

With a view to ensuring that the aperture 3 shall be opened and closed in a clean and stable manner, the lips 4 are joined over their whole length to reinforcing elements in the form of resiliently flexible metal laminae 11.

Figure 4:
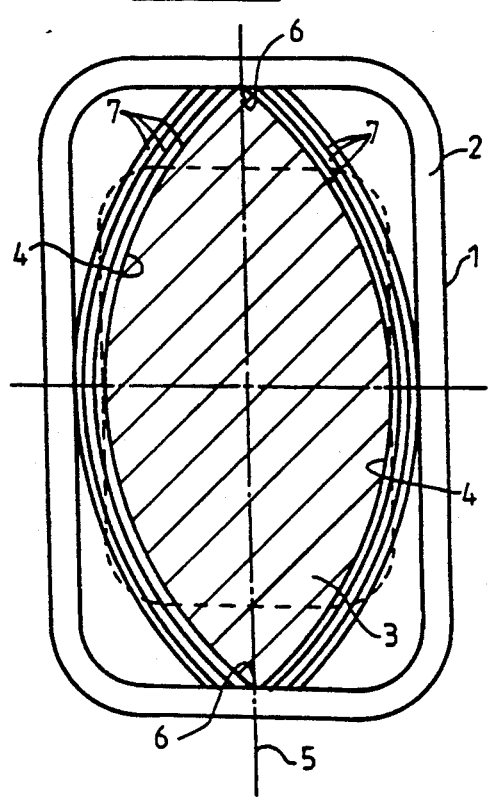
FIG. 4 is a view similar to FIG. 1, but shows a modification.

These laminae may be attached half-way along their length, respectively to the end of a sheath 12, and to a cable 13 which is arranged to slide in the sheath and which projects beyond the end of the sheath. Thus, as shown in FIG. 4, the sheath 12 may be attached to one of the laminaed lips while the cable 13 may be attached to the other laminaed lips. The sliding movement of the cable 13 in the sheath 12 causes the opening and closing movement of the aperture. See FIGS. 2 and 3.

FIG. 4 shows a modification of the membrane in which the cross sectional views in FIGS. 2 and 3 remain applicable, and the same reference numerals are used as in FIG. 1 to indicate similar elements. The membrane in FIG. 4 differs from that of FIG. 1 in that the lips 4 extend longitudinally up to the flat marginal zone 2, with their two junction zones 6 being fixed. The length of the lips is thus greater in the open position seen in FIG. 4. It follows that the two groups of folds 7 also extend longitudinally up to the zone 2, on either side of the plane 5. Without being joined to each other. Each of the metallic reinforcing laminae associated respectively with the two lips 4 of FIG. 1 are fixed to the wall of the duct 8 in the vicinity of the junction zones 6 of the lips 4.

However, the device seen in FIG. 1 has the advantage of being simpler to make than that in FIG. 4. On the other hand, the latter gives a larger flow cross section for the flow of fluid (indicated by the hatched area in FIGS. 1 and 4), for a given cross section of the duct 8.

The fluid flow is continuously adjustable by causing the distance between the central zones of the lips 4 to vary from the maximum value (corresponding to the position shown in FIGS. 1, 2 and 4) to the zero value corresponding to the position seen in FIG. 3. A given membrane may have a plurality of apertures such as the aperture 3, with each aperture being delimited by two lips, such as the lips 4, associated with two groups of folds such as the folds 7.

What is claimed is:

1. A fluid flow control device comprising a fluid flow duct having a duct wall; a masking member arranged in and across said duct, said masking member being a deformable membrane having two lip members defining a transversely extending aperture through the thickness of the membrane, the membrane further having two groups of bellows-type folds extending in the same general direction as said aperture and on either side of the latter,; and an actuating member cooperable with the aperture defining lip members of the membrane, whereby the actuating member can engage the lip members of the membrane so as to move them apart to put the membrane in a first position in which the aperture is open and so as to bring said lip members together to put the membrane in a second position in which the aperture is closed.

2. A device according to claim 1, further including elongated reinforcing elements carried by said lip members of the membrane.

3. A device according to claim 2, wherein said reinforcing elements are in the form of resilient metallic laminae having surfaces facing each other.

4. A device according to claim 2, wherein one said metallic reinforcing lamina is carried by each said lip members of the membrane, whereby the ends of the laminae can move closer together in the said first position and further apart in the said second position.

5. A device according to claim 1, wherein the membrane is provided with a first reinforcing element having a central zone and a second reinforcing element opposed to the first reinforcing element and having a central zone, the actuating member comprising a sheath having one end attached in the central zone of said first reinforcing element, and a cable mounted for sliding movement in the sheath and having an end portion projecting from the sheath beyond the said fixed end of the latter, said cable portion being attached in the central zone of said second reinforcing element.

6. A membrane for use in a flow control device comprising a peripheral zone for attachment to the wall of a fluid flow duct, deformable lip members defining a transverse aperture extending through the thickness of the membrane, and means defining two groups of bellows-type folds extending in the same general direction as said aperture on either side of the later, whereby said lip members of the aperture can be spaced apart so as to open the aperture in a lenticular shape and brought together so as to close the aperture.

* * * * *